(12) United States Patent
Hirata et al.

(10) Patent No.: US 6,407,199 B1
(45) Date of Patent: Jun. 18, 2002

(54) POLYCARBONATE RESIN COMPOSITION OPTICAL RECORDING MEDIUM, AND SUBSTRATE THEREFOR

(75) Inventors: Masumi Hirata; Toru Sawaki; Wataru Funakoshi; Katsushi Sasaki; Jyuhou Matsuo, all of Iwakuni (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/744,559

(22) PCT Filed: May 24, 2000

(86) PCT No.: PCT/JP00/03313

§ 371 (c)(1),
(2), (4) Date: Jan. 26, 2000

(87) PCT Pub. No.: WO00/73387

PCT Pub. Date: Dec. 7, 2000

(30) Foreign Application Priority Data

| May 27, 1999 | (JP) | ............................................... 11-148048 |
| May 27, 1999 | (JP) | ............................................... 11-148049 |
| Dec. 21, 1999 | (JP) | ............................................... 11-362101 |
| Dec. 21, 1999 | (JP) | ............................................... 11-362700 |
| Dec. 21, 1999 | (JP) | ............................................... 11-362702 |

(51) Int. Cl.[7] ............................................... C08G 64/00
(52) U.S. Cl. ........................... 528/196; 528/198; 428/64
(58) Field of Search ................................. 528/196, 198; 428/64

(56) References Cited

U.S. PATENT DOCUMENTS 5,516,878 A  5/1996  Sasaki et al. ............... 528/199

FOREIGN PATENT DOCUMENTS

| DE | 2729485 | 1/1978 | |
| DE | 2729485 C2 | 5/1985 | ........... C08L/69/00 |
| GB | 1567517 | 5/1980 | ........... C08K/5/10 |
| JP | 47-41092 | 10/1972 | ........... C08K/5/10 |
| JP | 55-4141 | 1/1980 | ........... C08L/69/00 |
| JP | 55-86837 | 7/1980 | ........... C08L/69/00 |
| JP | 62-64860 | 3/1987 | ........... C08L/69/00 |
| JP | 1-315459 | 12/1989 | ........... C08L/69/00 |
| JP | 1-315460 | 12/1989 | ........... C08L/69/00 |
| JP | 2-48081 | 10/1990 | ........... C08L/69/00 |
| JP | 7-268091 | 10/1995 | ........... C08G/64/30 |
| JP | 8-59975 | 3/1996 | ........... C08L/69/00 |
| JP | 8-73724 | 3/1996 | ........... C08L/69/00 |

*Primary Examiner*—Terressa M. Boykin
(74) *Attorney, Agent, or Firm*—Sughrue Mion, PLLC

(57) ABSTRACT

A polycarbonate resin composition which is excellent in thermal stability such as color retention at the time of melt molding, for example, the prevention of yellowing, and moldability such as releasability and transferability and therefore particularly suitable for the production of precision optical moldings such as optical disk substrates and lenses. The polycarbonate resin composition comprises (A) an aromatic polycarbonate, and (B) a cyclic carbonate compound, a monoester compound of a divalent aliphatic alcohol having 3 to 14 carbon.atoms and an aliphatic monocarboxylic acid having 12 to 24 carbon atoms, or an ether compound obtained by converting at least one hydroxyl group of a polyvalent aliphatic alcohol having 3 to 14 carbon atoms into an aliphatic oxy group having 1 to 18 carbon atoms, or (C) a partial ester compound of an aliphatic alcohol having a valence of 2 to 6 and 2 to 14 carbon atoms and an aliphatic monocarboxylic acid having 12 to 24 carbon atoms, a cyclic phenol compound or a compound selected from hydrochloric acid, phosphoric acid, phosphorous acid, boric acid, and amine salts and ammonium salts thereof.

26 Claims, No Drawings

POLYCARBONATE RESIN COMPOSITION OPTICAL RECORDING MEDIUM, AND SUBSTRATE THEREFOR

The present invention relates to a polycarbonate resin composition, an optical recording medium comprising the same and a substrate for the optical recording medium. More specifically, it relates to a novel polycarbonate resin composition which is satisfactory in terms of thermal stability such as color retention during molding and excellent in moldability such as releasability and transferability, an optical recording medium comprising the composition and a substrate for the optical recording medium.

PRIOR ARTS

Aromatic polycarbonates are widely used in various fields including optical parts, mechanical parts and auto parts, thanks to their excellent mechanical properties such as impact resistance, heat resistance and transparency.

The aromatic polycarbonates have recently been in great demand as optical moldings. owing to their excellent optical properties and widely used in optical disks, information disks, optical lenses, prisms and the like. Along with this, higher thermal stability, releasability and transferability have been required of the aromatic polycarbonates.

Since optical disks, information disks, optical lenses and the like are mainly produced by injection molding, if mold release resistance is large when these moldings are removed from a mold, they are warped, causing optical distortion. Therefore, a release agent must be used. Particularly in the production of an optical recording disk such as a compact disk (CD) or laser disk (LD), it is injection molded at a temperature higher than 300° C. to accurately transfer 1 μm or less fine irregularities of a stamper. Therefore, thermal stability is also required of a resin used in addition to releasability.

Paraffin, silicone oil, fatty acid, fatty acid esters, fatty acid partial esters and the like have been known as release agents for polycarbonate resins. Particularly, fatty acid esters, specifically partial esters of polyhydric alcohols have recently been used to improve the releasability of polycarbonate resins for optical disks.

JP-B 47-41092 (the term "JP-B" as used herein means an "examined Japanese patent publication") discloses a lubricating polycarbonate resin composition prepared by adding 0.05 to 5 wt % of an ester or partial ester of an aliphatic saturated monocarboxylic acid having 12 to 30 carbon atoms and an aliphatic saturated monohydric alcohol or polyhydric alcohol having 30 or less carbon atoms to a polycarbonate resin.

JP-B 2-48081 discloses a polycarbonate resin composition which contains a monoglyceride of a saturated monovalent fatty acid having 16 to 22 carbon atoms in an amount of 0.01 to 0.2 part by weight based on 100 parts by weight of a polycarbonate having a viscosity average molecular weight of about 12,000 to about 19,000 and provides moldings having excellent mold transferability and an unscratched surface as well as optical moldings thereof.

JP-A 8-73724 (the term "JP-A" as used herein means an "unexamined published Japanese patent application") discloses a polycarbonate resin composition which contains a partial ester of an aliphatic carboxylic acid and a polyhydric alcohol in an amount of 0.01 to 0.1 part by weight based on 100 parts by weight of an aromatic polycarbonate resin having a terminal hydroxyl concentration of 2 to 40 molt and a molecular weight distribution (Mw/Mn) of 2.0 to 2.8 and has excellent releasability, heat resistance and transferability.

JP-B 55-4141 discloses an antistatic polycarbonate composition which contains an aliphatic monoglyceride in an amount of 0.1 to 5 parts by weight based on 100 parts by weight of a polycarbonate to improve the antistatic properties of the polycarbonate.

The partial ester of a saturated aliphatic monocarboxylic acid and a polyhydric alcohol disclosed by the above prior art readily thermally decomposes of itself or readily reacts with a polymer to cause thermal decomposition or ester exchange reaction. Therefore, when a conventional partial ester of a saturated monocarboxylic acid and a polyhydric alcohol is added to a polycarbonate resin, such inconvenience may occur as an increase in the amount of the residual phenol, deterioration in the quality of a molded product at the time of melt molding at a high temperature, and the formation of a silver streak as the case may be.

When other release agent, for example, a complete ester of a polyhydric alcohol is used, if the amount of the release agent is the same as that of a partial ester of a saturated aliphatic monocarboxylic acid and a polyhydric alcohol, there will be no problem with thermal stability but sufficient releasability cannot be obtained.

For the above reasons, a polycarbonate resin composition which has excellent thermal stability and releasability at the time of melt molding and a release agent satisfactory for use with the polycarbonate resin composition have been desired.

SUMMARY OF THE INVENTION

It is a principal object of the present invention to provide a polycarbonate resin composition which solves the above problems of the prior art and has sufficient releasability and thermal stability.

It is another object of the present invention to provide a polycarbonate resin composition which is excellent in both thermal stability such as color retention, for example, prevention -of yellowing at the time of melt molding and moldability such as releasability and transferability and is suitable for the production of precision optical moldings such as optical disk substrates and lenses.

It is still another object of the present invention to provide a substrate for optical recording media made from the polycarbonate resin composition of the present invention.

It is a further object of the present invention to provide an optical recording medium comprising the substrate of the present invention.

It is a still further object of the present invention to provide a novel releasability modifier for improving the releasability of a polycarbonate resin.

It is a still further object of the present invention to provide a novel thermal yellowing inhibitor for preventing the thermal yellowing of a polycarbonate resin.

Other objects and advantages of the present invention will become apparent from the following description.

According to the present invention, firstly, the above objects and advantages of the present invention are attained by an aromatic polycarbonate resin composition (may be referred to as "first composition of the present invention" hereinafter) comprising:

(A) 100 parts by weight of an aromatic polycarbonate; and
(B) $5 \times 10^{-4}$ to 0.5 part by weight of at least one compound selected from the group consisting of a cyclic carbonate compound represented by the following formula (1), a monoester compound of a divalent aliphatic alcohol having 3 to 14 carbon atoms and an aliphatic monocarboxylic acid having 12 to 24 carbon atoms, and an ether compound obtained by converting at least one hydroxyl group of a polyvalent. aliphatic alcohol having 2 to 14 carbon atoms into an aliphatic oxy group having 1 to 18 carbon atoms:

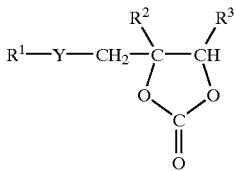
(1)

wherein $R^1$ is a monovalent hydrocarbon group having 1 to 20 carbon atoms, $R^2$ and $R^3$ are the same or different and each a hydrogen atom or monovalent hydrocarbon group having 1 to 10 carbon atoms, and Y is a single bond, ether bond, ester bond or carbonate bond.

Secondly, the above objects and advantages. of the present invention are attained by an aromatic polycarbonate resin composition (may be referred to as "second composition of the present invention" hereinafter) comprising:
(A) 100 parts by weight of an aromatic polycarbonate:
(D) $5 \times 10^{-4}$ to 0.5 part by weight of a partial ester compound of an aliphatic alcohol having a valence of 2 to 6 and 2 to 14 carbon atoms and an aliphatic monocarboxylic acid having 12 to 24 carbon atoms; and
(C) $1 \times 10^{-5}$ to $1 \times 10^{-2}$ part by weight of a cyclic compound represented by the following formula (3):

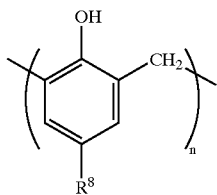
(3)

wherein $R^8$ is a hydrogen atom or hydrocarbon group having 1 to 4 carbon atoms, and n is a number of 4 to 20, or at least one compound selected from the group consisting of hydrochloric acid, phosphoric acid, phosphorous acid, boric acid and amine salts and ammonium salts thereof.

Thirdly, the above objects and advantages of the present invention are attained by a substrate for optical recording media made from the first composition or the second composition of the present invention.

In the fourth place, the above objects and advantages of the present invention are attained by an optical recording medium comprising the substrate for optical recording media of the present invention and an optical recording layer formed on one side of the substrate directly or through an interlayer.

In the fifth place, the above objects and advantages of the present invention are attained by a releasability modifier for aromatic polycarbonates which is the compound (B) constituting the first composition of the present invention.

In the sixth place, the above objects and advantages. of the present invention are attained by a thermal yellowing inhibitor for aromatic polycarbonates which comprises the compound represented by the above formula (3) constituting the second composition of the present invention.

DETAILED DESCRIPTION OF THE PREFERRED EMBODIMENTS

Preferred embodiments of the present invention will be described hereinafter. A description is first given of the first composition of the present invention.

The aromatic polycarbonate (A) is a thermoplastic polycarbonate comprising a carbonic acid ester of an aromatic diol compound as the main recurring unit.

The recurring unit is represented by the following formula (2):

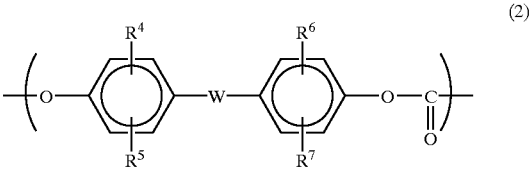
(2)

wherein $R^4$, $R^5$, $R^6$ and $R^7$ are independently a hydrogen atom, alkyl group having 1 to 10 carbon atoms, aryl group having 6 to 10 carbon atoms or aralkyl group having 7 to 10 carbon atoms, and W is an alkylene group having 1 to 10 carbon atoms, alkylidene group having 2 to 10 carbon atoms, cycloalkylene group having 6 to 10 carbon atoms, cycloalkylidene group having 6 to 10 carbon atoms, alkylene-arylene-alkylene group having 8 to 15 carbon atoms, oxygen atom, sulfur atom, sulfoxide group or sulfone group.

The alkyl group having 1 to 10 carbon atoms may be linear or branched. Examples of the alkyl group include methyl, ethyl, propyl, butyl, octyl, decyl and the like. Examples of the aryl group having 6 to 10 carbon atoms include phenyl, tolyl, cumyl, naphthyl and the like. Examples of the aralkyl group having 7 to 10 carbon atoms include benzyl, 2-phenethyl, 2-methyl, 2-phenylethyl and the like.

$R^4$, $R^5$, $R^6$ and $R^7$ are preferably independently a hydrogen atom, methyl group or t-butyl group, particularly preferably a hydrogen atom.

W is as defined hereinabove.

The alkylene group having 1 to 10 carbon atoms may be linear or branched. Examples of the alkylene group include methylene, 1,2-ethylene, 2,2-propylene, 2,2-butylene, 1,1-decylene and the like.

Examples of the alkylidene group having 2 to 10 carbon atoms include ethylidene, propylidene, butylidene, hexylidene and the like.

Examples of the cycloalkylene group having 6 to 10 carbon atoms include 1,4-cyclohexylene, 2-isopropyl-1,4-cyclohexylene and the like.

Examples of the cycloalkylidene group having 6 to 10 carbon atoms include cyclohexylidene, isopropylcyclohexylidene and the like.

Examples of the alkylene-arylene-alkylene group having 8 to 15 carbon atoms include m-diisopropylphenylene group and the like.

W is preferably a cyclohexylidene group or 2,2-propylidene group, particularly preferably 2,2-propylidene group.

The aromatic polycarbonate contains the recurring unit represented by the above formula (2) in an amount of 50 mol % or more, preferably 70 mol % or more, particularly preferably 80 mol % or more based on the total of all the recurring units. One having ordinary skill in the art would understand recurring units which may be optionally contained other than the recurring unit represented by the above formula (2) from the following description.

The aromatic polycarbonate used in the present invention has a viscosity average molecular weight of preferably 5,000 to 100,000, more preferably 7,000 to 50,000, much more preferably 10,000 to 18,000.

The aromatic polycarbonate used in the present invention comprises an aryloxy group (a) and a phenolic OH group (b) as the main terminal group structure and the molar ratio of the component (a) to the component (b) is preferably 95/5 to 40/60. That is, the phenolic terminal group concentration is preferably 60 mol % or less, more preferably 40 mol % or less, much more preferably 30 mol % or less.

The ratio (Mw/Mn) of weight average molecular weight (Mw) to number average molecular weight (Mn) of the aromatic polycarbonate is preferably 3.6 or less, more preferably 3 or less.

The aromatic polycarbonate used in the present invention may be preferably produced from an aromatic dihydroxy compound and a carbonate bond forming compound by conventionally known methods such as interfacial polymerization using phosgene, melt polymerization and solid-phase polymerization.

The aromatic dihydroxy compound is preferably a compound represented by the following formula (2)-1.

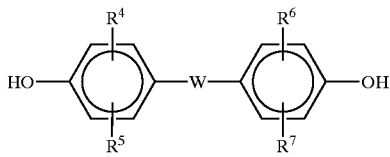

(2)-1 wherein $R^4$, $R^5$, $R^6$, $R^7$ and W are as defined in the above formula (2).

Examples of the aromatic dihydroxy compound (2)-1 include bis(4-hydroxyaryl)alkanes such as bis(4-hydroxyphenyl)methane, 2,2-bis(4-hydroxyphenyl)propane, 1,1-bis(4-hydroxyphenyl)ethane, 2,2-bis(4-hydroxy-3-methylphenyl)propane, 2,2-bis(4-hydroxyphenyl)heptane, 2,2-bis(4-hydroxy-3,5-dichlorophenyl)propane, bis(4-hydroxyphenyl)phenylmethane, 4,4'-dihydroxyphenyl-1,1'm-diisopropylbenzene and 4,4'-dihydroxyphenyl-9,9-fluorene; bis(hydroxyaryl)cycloalkanes such as 1,1-bis(4-hydroxyphenyl)cyclopentane, 1,1-bis(4-hydroxyphenyl)cyclohexane, 1-methyl-1-(4-hydroxyphenyl)-4-(dimethyl-4-hydroxyphenyl)methyl-cyclohexane, 4-[1-[3-(4-hydroxyphenyl)-4-methylcyclohexyl]-1-methylethyl]-phenol, 4,4'-[1-methyl-4-(1-methylethyl)-1,3-cyclohexanediyl]bisphenol and 2,2,2',2'-tetrahydro-3,3,3',3'-tetramethyl-1,1'-spirobis-[1H-indene]-6,6'-diol; dihydroxyaryl ethers such as bis(4-hydroxyphenyl)ether, bis(4-hydroxy-3,5-dichlorophenyl)ether and 4,4'-dihydroxy-3,3'-dimethylphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; dihydroxydiaryl sulfones such as 4,4'-dihydroxydiphenyl sulfone and 4,4'-dihydroxy-3,3'-dimethyldiphenyl sulfone; dihydroxydiaryl isatins such as 4,4'-dihydroxydiphenyl-3,3'-isatin; dihydroxydiaryl xanthenes such as 3,6-dihydroxy-9,9-dimethyl xanthene; dihydroxybenzenes such as resorcin, 5-methylresorcin, 5-ethylresorcin, 5-t-butylresorcin, 5-phenylresorcin, 5-cumylresorcin, hydroquinone, 2-methylhydroquinone, 2-ethylhydroquinone, 2-t-butylhydroquinone, 2-phenylhydroquinone and 2-cumylhydroquinone; and dihydroxydiphenyls such as 4,4'-dihydroxydiphenyl and 3,3'-dichloro-4,4'-dihydroxydiphenyl.

Out of these, 2,2-bis(4-hydroxyphenyl)propane is preferred because it has stability as a monomer and a small content of impurities and is easily acquired.

In the present invention, at least one monomer may be optionally contained in the molecule of the aromatic polycarbonate to control glass transition temperature, improve flowability or control optical properties such as an increase in refractive index or a reduction in birefringence.

Examples of the monomer include aliphatic dihydroxy compounds such as ethylene glycol, 1,4-butanediol, 1,4-cyclohexane dimethanol, 2,2-dimethyl-1,3-propanediol, 1,10-decanediol, diethylene glycol, polyethylene glycol and polytetramethylene glycol; dicarboxylic acids such as succinic acid, isophthalic acid, 2,6-naphthalenedicarboxylic acid, adipic acid, cyclohexanedicarboxylic acid and terephthalic acid; and oxyacids such as p-hydroxybenzoic acid, 6-hydroxy-2-naphthoic acid and lactic acid.

A carbonyl halide such as phosgene or haloformate compound is used as the carbonate bond forming compound in the interfacial polymerization method.

An aromatic carbonic acid ester such as diphenyl carbonate, ditolyl carbonate, bis(2-chlorophenyl)carbonate or m-cresyl carbonate is used as the carbonate bond forming compound in the melt polymerization method. Also, dimethyl carbonate, dibutyl carbonate or dicyclohexyl carbonate may be used as desired.

Out of these, diphenyl carbonate is particularly preferred from the viewpoints of reactivity, stability against the color development of the obtained resin and costs.

In the solid-phase polymerization method, an aromatic carbonate oligomer having a low molecular weight produced by the phosgene method or melt polymerization method is crystallized and polymerized in a solid state at a high temperature and optionally at a reduced pressure to produce an aromatic polycarbonate having a recurring unit structure represented by the formula (2).

In the above aromatic polycarbonate production method, an aromatic polyester carbonate can be produced by using a dicarboxylic acid or a dicarboxylic acid derivative such as a dicarboxylic acid halide or dicarboxylic acid ester in conjunction with phosgene or carbonic acid diester. This aromatic polyester carbonate may be-used as the aromatic polycarbonate in the present invention.

Examples of the dicarboxylic acid or dicarboxylic acid derivative include aromatic dicarboxylic acids such as terephthalic acid, isophthalic acid, terephthalic acid chloride, isophthalic acid chloride, diphenyl terephthalate and diphenyl isophthalate; aliphatic dicarboxylic acids such as succinic acid, glutaric acid, adipic acid, suberic acid, azelaic acid, sebacic acid, decane diacid, dodecane diacid, adipic acid chloride, suberic acid chloride, azelaic acid chloride, sebacic acid chloride, diphenyl azelate, diphenyl sebacate, decane diacid diphenyl and dodecane diacid diphenyl; and alicyclic dicarboxylic acids such as cyclopropanedicarboxylic acid, 1,3-cyclobutanedicarboxylic acid, 1,3-cyclopentanedicarboxylic acid, 1,3-cyclohexanedicarboxylic acid, 1,4-cyclohexanedicarboxylic acid, cyclopropanedicarboxylic acid chloride, 1,3-cyclobutanedicarboxylic acid chloride, 1,3-cyclopentanedicarboxylic acid chloride, 1,3-cyclohexanedicarboxylic acid chloride, 1,4-cyclohexanedicarboxylic acid chloride, diphenyl cyclopropane dicarboxylate, diphenyl 1,3-cyclobutane dicarboxylate, diphenyl 1,3-cyclopentane dicarboxylate, diphenyl 1,3-cyclohexane dicarboxylate and diphenyl 1,4-cyclohexane dicarboxylate.

To produce the aromatic polycarbonate having the recurring unit structure represented by the above formula (2), a polyfunctional compound having three or more functional groups in the molecular may be used in conjunction with the above dihydroxy compound. The functional compound is preferably a compound having a phenolic hydroxyl group or carboxyl group.

Examples of the polyfunctional compound include 1,1,1-tris(4-hydroxyphenyl)ethane, 2,2',2"-tris(4-hydroxyphenyl)-m-diisopropylbenzene, 2,2',2"-tris(4-hydroxyphenyl)-p-diisopropylbenzene, α-methyl-α, α', α"-tris(4-hydroxyphenyl)-1,4-diethylbenzene, α, α', α"-tris(4-hydroxyphenyl)-1,3,5-triisopropylbenzene, phloroglucin, 4,6-dimethyl-2,4,6-tris(4-hydroxyphenyl)heptane, 1,3,5-tris(4-hydroxyphenyl)benzene, 2,2-bis[4,4-(4-hydroxyphenyl)-cyclohexyl]-propane, trimellitic acid, 1,3,5-tricarboxybenzene, pyromellitic acid and the like.

Out of these, 1,1,1-tris(4-hydroxyphenyl)ethane and α, α', α"-tris(4-hydroxyphenyl)-1,3,5-triisopropylbenzene are preferred.

When a polyfunctional compound is used in combination, it is used in an amount of 0.03 mol or less, preferably 0.00005 to 0.02 mol, more preferably 0.0001 to 0.01.mol based on 1 mol of the aromatic dihydroxy compound to improve the melt viscosity of the polycarbonate.

In the above phosgene method out of the methods of producing the aromatic polycarbonate having the recurring unit represented by the above formula (2), a tertiary amine, quaternary ammonium salt, tertiary phosphine, quaternary phosphonium salt, nitrogen-containing heterocyclic compound or salt thereof, iminoether or salt thereof, or a compound having an amide group is used as a catalyst.

Since a large amount of an alkali metal compound or an alkali earth metal compound is used as an agent for trapping a hydrogen halide such as hydrochloric acid formed during a reaction in this phosgene method, it is preferred to carry out washing and purification thoroughly so as to prevent the above impurity from remaining in a polymer after production.

In the melt polymerization and solid-phase polymerization methods, an ester exchange catalyst containing an alkali metal compound or an alkali earth metal compound is preferably used. The alkali metal compound or alkali earth metal.compound used as a catalyst is used in an amount of $1\times10^{-8}$ to $1\times10^{-5}$ mol based on 1 mol of the aromatic dihydroxy compound. A carbonic acid diester is preferably used in an amount of 1.0 to 1.1 mols. Outside the above range, the alkali metal compound or alkali earth metal compound may exert a bad influence upon the physical properties of the obtained aromatic polycarbonate, an ester exchange reaction may not proceed fully, and an aromatic polycarbonate having a high molecular weight may not be obtained disadvantageously. An alkali metal compound is preferred as an ester exchange catalyst.

When the ester exchange catalyst is used in the above range, the production of the aromatic polycarbonate can be carried out efficiently at a high yield, and the physical properties of the obtained aromatic polycarbonate become preferred to attain the object of the present invention.

The alkali metal compound used as the ester exchange catalyst is, for example, a hydroxide, hydrocarbon compound, carbonate, acetate, nitrate, nitrite, sulfite, cyanate, thiocyanate, stearate, borohydride, benzoate, hydrogenphosphate, bisphenol or phenol salt of an alkali metal.

Specific examples of the alkali metal compound include sodium hydroxide, lithium hydroxide, sodium bicarbonate, potassium bicarbonate, sodium carbonate, cesium carbonate, sodium acetate, lithium acetate, rubidium nitrate, sodium nitrite, lithium nitrite, sodium sulfite, sodium cyanate, potassium cyanate, lithium cyanate, sodium thiocyanate, potassium thiocyanate, cesium thiocyanate, sodium stearate, sodium borohydride, potassium borohydride, lithium borohydride, sodium phenyl borate, sodium benzoate, lithium benzoate, disodium hydrogenphosphate, disodium salts, dilithium salts, monosodium salts, monopotassium salts, sodium potassium salts and sodium lithium salts of bisphenol A, and sodium salts and lithium salts of phenol.

A basic nitrogen compound and/or basic phosphorus compound are/is preferably used in combination as an ester exchange catalyst.

Out of these, examples of the basic nitrogen compound include ammonium hydroxides having an alkyl, aryl or alkylaryl group such as tetramethyl ammonium hydroxide ($Me_4NOH$), tetraethyl ammonium hydroxide ($Et_4NOH$), tetrabutyl ammonium hydroxide ($Bu_4NOH$), benzyltrimethyl ammonium hydroxide ($Ph—CH_2(Me)_3NOH$) and hexadecyltrimethyl ammonium hydroxide; basic ammonium salts having an alkyl, aryl or alkylaryl group such as tetramethyl ammonium acetate, tetraethyl ammonium phenoxide, tetrabutyl ammonium carbonate, benzyltrimethyl ammonium benzoate and hexadecyltrimethyl ammonium ethoxide; tertiary amines such as triethylamine, tributylamine, dimethylbenzylamine and hexadecyl dimethylamine; and basic salts such as tetramethyl ammonium borohydride ($Me_4NBH_4$), tetrabutyl ammonium borohydride ($Bu_4NBH_4$), tetrabutyl ammonium tetraphenyl borate ($Bu_4NBPh_4$) and tetramethyl ammonium tetraphenyl borate ($Me_4NBPh_4$).

Examples of the basic phosphorus compound include phosphonium hydroxides having an alkyl, aryl or alkylaryl group such as tetramethyl phosphonium hydroxide ($Me_4POH$), tetraethyl phosphonium hydroxide ($Et_4POH$), tetrabutyl phosphonium hydroxide ($Bu_4POH$), benzyltrimethyl phosphonium hydroxide ($Ph—CH_2(Me)_3POH$) and hexadecyltrimethyl phosphonium hydroxide; and basic salts such as tetramethyl phosphonium borohydride ($Me_4PBH_4$), tetrabutyl phosphonium borohydride ($Bu_4PBH_4$), tetrabutyl phosphonium tetraphenyl borate ($Bu_4PBPh_4$) and tetramethyl phosphonium tetraphenyl borate ($Me_4PBPh_4$).

The basic nitrogen compound and/or basic phosphorus compound are/is used in such an amount that the amount of the basic nitrogen atom or basic phosphorus atom becomes $1\times10^{-5}$ to $5\times10^{-4}$ mol based on 1 mol of the aromatic dihydroxy compound. The amount of the basic nitrogen compound and/or basic phosphorus compound are/is more preferably such that the amount of the basic nitrogen atom or basic phosphorus atom becomes $2\times10^{-5}$ to $5\times10^{-4}$, particularly preferably $5\times10^{-5}$ to $5\times10^{-4}$ based on the same standard.

The alkali metal compound used as a catalyst may be the ate-complex alkali metal salt of the group XIV element of the periodic table or the alkali metal salt of the oxo acid of the group XIV element of the periodic table as desired. The group XIV element of the periodic table is silicon, germanium or tin. By using the alkali metal compound as a polycondensation reaction catalyst, a polycondensation reaction can be promoted quickly and completely. In addition, the alkali metal compound can control an undesired secondary reaction such as a branching reaction which proceeds during the polycondensation reaction to a low level.

What are enumerated in JP-A 7-268091 may be used as the ate-complex alkali metal salt of the group XIV element of the periodic table, as exemplified by $NaGe(OMe)_5$, $NaGe(OPh)_5$, $LiGe(OMe)_5$, $LiGe(OPh)_5$, $NaSn(OMe)_3$, $NaSn(OMe)_5$, $NaSN(OPh)_5$ and the like.

The alkali metal salt of the oxo acid of the group XIV element of the periodic table is preferably the alkali metal salt of silicic acid, stannic acid, germanium (II) acid or germanium (IV) acid.

Examples of the above alkali metal salt include disodium orthosilicate, disodium monostannate, tetrasodium monostannate, monosodium germanate(II) (NaHGeO$_2$), disodium orthogermanate(IV), tetrasodium orthogermanate (IV) and the like.

In the polycondensation reaction, at least one compound selected from the group consisting of oxo acids and oxides of the group XIV elements of the periodic table and alkoxides and phenoxides of the same elements may be optionally existent as a co-catalyst together with the above alkali metal compound catalyst.

By using the co-catalyst, undesired phenomena such as a branching reaction which easily occurs during the polycondensation reaction, a main-chain cleavage reaction, the formation of foreign matter in the apparatus during molding and yellowing can be suppressed effectively without reducing the rate of molecular terminal capping reaction and the rate of polycondensation reaction.

The oxo acids of the group XIV elements of the periodic table include silicic acid, stannic acid and germanic acid.

The oxides of the group XIV elements of the periodic table include silicon dioxide, tin dioxide, germanium monoxide, germanium dioxide, silicon tetramethoxide, silicon tetrabutoxide, silicon tetraphenoxide, tetraethoxy tin, tetranonyloxy tin, tetraphenoxy tin, tetramethoxy germanium, tetrabutoxy germanium, tetraphenoxy germanium and condensates thereof.

The co-catalyst is preferably existent in such a proportion that the amount of the group XIV element of the periodic table becomes 50 molar atoms or less based on 1 molar atom of an alkali metal element contained in the polycondensation reaction catalyst. When the co-catalyst is used in such a proportion that the amount of the metal element is more than 50 molar atoms, the polycondensation reaction slows down disadvantageously. The co-catalyst is more preferably existent in such a proportion that the amount of the group XIV element of the periodic table becomes 0.1 to 30 molar atoms based on 1 molar atom of the alkali metal element contained in the polycondensation reaction catalyst.

In the present invention, when the aromatic polycarbonate is a polymer produced by the above melt polycondensation method, it preferably further contains a sulfonic acid compound represented by the following formula (4):

$$A^1—SO_3X^1 \quad (4)$$

wherein $A^1$ is a monovalent hydrocarbon group having 1 to 30 carbon atoms which may have a substituent, and $X^1$ is a ammonium cation, phosphonium cation or monovalent hydrocarbon group having 1 to 10 carbon atoms.

When the sulfonic acid compound is contained, the activity of the alkali metal or alkali earth metal compound used as a catalyst in melt polycondensation can be lowered or deactivated and a polycarbonate having excellent quality such as color, heat resistance and hydrolysis resistance can be obtained. The sulfonic acid compound is preferably a phosphonium sulfonate represented by the following formula (4)-1 because it has a great effect:

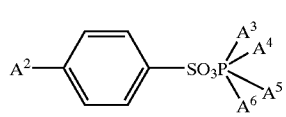

(4)-1 wherein $A^2, A^3, A^4, A^5$ and $A^6$ are independently a monovalent hydrocarbon group having 1 to 20 carbon atoms.

$A^2$ in the above formula (4)-1 is preferably a group selected from hydrogen atom, methyl group, hexyl group and dodecyl group, and each of $A^3$ to $A^6$ are preferably independently a group selected from methyl group, butyl group and octyl group.

The sulfonic acid compound functions as a deactivator for an ester exchange polymerization catalyst remaining in a polymer. Known catalyst deactivators disclosed, for example, by JP-A 8-59975 maybe effectively used, out of which ammonium salts of sulfonic acid and phosphonium salts of sulfonic acid are particularly preferred. Specific examples of the sulfonic acid compound include ammonium salts and phosphonium salts of dodecylbenzenesulfonic acid, ammonium salts and phosphonium salts of paratoluenesulfonic acid and ammonium salts and phosphonium salts of benzenesulfonic acid.

In the present invention, sulfonic acid compounds represented by the above formula (4)-1 (particularly tetrabutyl phosphonium dodecylbenzene sulfonate and tetrabutyl ammonium paratoluenesulfonate) are the most. preferably used out of these catalyst deactivators.

The catalyst deactivator greatly lowers the activity of a catalyst. The catalyst deactivator may be added to a polycarbonate resin, or a mixed solution of water and the catalyst deactivator may be added to a polycarbonate resin.

The amount of the catalyst deactivator added to the polycarbonate resin obtained by melt polymerization is 0.5 to 50 mols, preferably 0.5 to 10 mols, more preferably 0.8 to 5 mols based on 1 mol of the main polycondensation catalyst selected from alkali metal compounds and alkali earth metal compounds. The amount is equivalent to $1 \times 10^{-2}$ to $1 \times 10^{-5}$ part by weight based on 100 parts by weight of the polycarbonate resin.

The compound (B) is a cyclic carbonate compound, monoester compound or ether compound.

The cyclic carbonate compound is represented by the following formula (1):

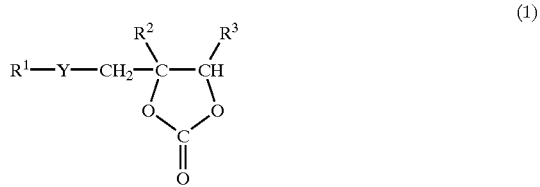

(1)

wherein $R^1$ is a monovalent hydrocarbon group having 1 to 20 carbon atoms, $R^2$ and $R^3$ are the same or different and each a hydrogen atom or monovalent hydrocarbon group having 1 to 10 carbon atoms, and Y is a single bond, ether bond, ester bond or carbonate bond.

Since the cyclic compound does not have a hydroxyl group in the molecule, it can greatly suppress an increase in the amount of the residual phenol which is seen when a partial ester of a saturated monocarboxylic acid by using of cyclic compound and a polyhydric alcohol is used, or yellowing at the time of high-temperature molding caused by thermal decomposition due to a reaction with a polymer or the like.

In the above formula (1), $R^1$ is preferably a linear alkyl group having 10 to 20 carbon atoms, and $R^2$ and $R^3$ are preferably a hydrogen atom or linear or branched alkyl having 1 to 6 carbon atoms.

Out of the compounds of the formula (1), cyclic compounds represented by the following formula (1)-1 are particularly preferred:

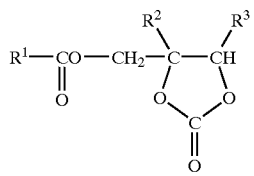

(1)-1 wherein $R^1$, $R^2$ and $R^3$ are as defined hereinabove.

The cyclic compounds represented by the above formula (1) include the following compounds.

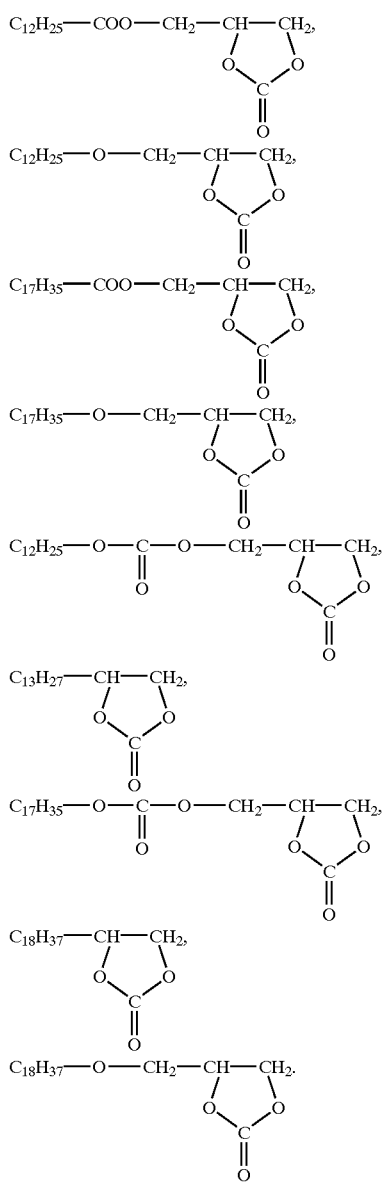

The above cyclic compounds can be easily obtained by a commonly used organic reaction.

The monoester compound is a monoester of a divalent aliphatic alcohol having 3 to 14 carbon atoms and an aliphatic monocarboxylic acid having 12 to 24 carbon atoms.

Among the divalent aliphatic alcohol having 3 to 14 carbon atoms, those, one hydroxyl group of which is at the 1-position are preferable.

Examples of the divalent aliphatic alcohol having 3 to 14 carbon atoms include propanediol, butanediol,-pentanediol, hexanediol and decanediol. Out of these, propanediol and butanediol are particularly preferred.

The aliphatic monocarboxylic acid having 12 to 24 carbon atoms is preferably a saturated aliphatic monocarboxylic acid. Monoesters of an aliphatic monocarboxylic acid having 12 or less carbon atoms show a tendency toward a reduction in the heat resistance of a polycarbonate composition and readily causes the generation of gas in a polycarbonate composition. Meanwhile, monoesters of an aliphatic monocarboxylic acid having 24 or more carbon atoms tend to lower the releasability of a polycarbonate composition disadvantageously.

Examples of the aliphatic monocarboxylic acid having 12 to 24 carbon atoms include lauric acid, dodecylic acid, pentadecylic acid, palmitic acid, heptadecylic acid, stearic acid, nonadecanoic acid, arachic acid, behenic acid and lignoceric acid. Out of these, stearic acid and palmitic acid are particularly preferred.

The monoester compound is preferably an aliphatic monoester of propanediol represented by the following formula:

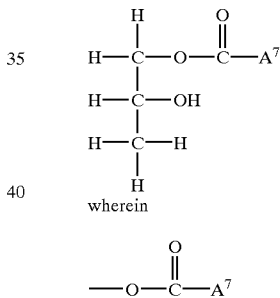

wherein $$-O-\overset{O}{\underset{\|}{C}}-A^7$$

is the residual group of an aliphatic monocarboxylic acid having 12 to 24 carbon atoms, and $A^7$ is preferably pentadecyl, heptadecyl or henicosyl.

The ether compound is an ether compound obtained by converting at least one hydroxyl group of a polyvalent aliphatic alcohol having 2 to 14 carbon atoms into an aliphatic oxy group having 1 to 18 carbon atoms.

The polyvalent aliphatic alcohol having 2 to 14 carbon atoms is preferably an aliphatic alcohol having a valence of 2 to 6, more preferably aliphatic alcohol having a valence of 2 or 3. Examples of the polyvalent aliphatic alcohol include ethylene glycol, propylene glycol, neopentyl glycol, glycerin, trimethylol propane and pentaerythritol. Out of these, glycerin is particularly preferred.

The aliphatic oxy group having 1 to 18 carbon atoms is preferably an alkoxy group having 1 to 18 carbon atoms. Examples of the alkoxy group include methoxy, ethoxy, n-propoxy, iso-propoxy, n-butoxy, sec-butoxy, iso-butoxy, t-butoxy, n-pentoxy, n-hexoxy, n-octoxy, decyloxy, dodecyloxy, hexadecyloxy and octadecyloxy.

Preferably, the above ether compound is obtained by converting at least one hydroxyl group of a polyvalent aliphatic alcohol into an aliphatic oxy group having 1 to 18 carbon atoms and has at least one residual hydroxyl group.

The ether compound is more preferably a compound represented by the following formula:

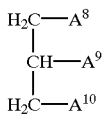

wherein $A^8$, $A^9$ and $A^{10}$ are independently an alkoxy group having 1 to 18 carbon atoms or hydroxyl group, with the proviso that at least one of $A^8$ to $A^{10}$ is an alkoxy group having 1 to 18 carbon atoms and at least one of them is a hydroxyl group.

The ether compound is particularly preferably a compound of the above formula in which $A^8$ is an alkoxy group having 1 to 18 carbon atoms, and $A^9$ and $A^{10}$ are both a hydroxyl group.

Illustrative examples of the particularly preferred ether compound are batyl alcohol and chimyl alcohol.

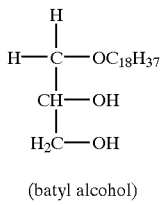 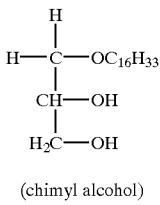

(batyl alcohol)   (chimyl alcohol)

The above cyclic carbonate compound, monoester compound and ether compound may be used alone or in combination of two or more as the above compound (B).

The compound (B) is used in an amount of $5 \times 10^{-4}$ to 0.5 part by weight based on 100 parts by weight of the aromatic polycarbonate (A). Outside the above range, the heat resistance of the obtained polycarbonate composition deteriorates and sufficient releasability cannot be obtained. The amount of the compound (B) is preferably $5 \times 10^{-4}$ to 0.3 part by weight, more preferably $5 \times 10^{-4}$ to 0.1 part by weight, much more preferably $7 \times 10^{-4}$ to $8 \times 10^{-2}$ part by weight, particularly preferably $1 \times 10^{-3}$ to $7 \times 10^{-2}$ part by weight based on the same standard.

The compound (B) used in the first composition of the present invention improves the releasability of the aromatic polycarbonate. Use of the compound (B) as a releasability modifier is new and first provided by the present invention.

The first composition of the present invention may further contain a partial ester compound (D) of an aliphatic alcohol having a valence of 2 to 6 and 2 to 14 carbon atoms and an aliphatic monocarboxylic acid having 12 to 24 carbon atoms as an optional component.

Examples of the aliphatic alcohol having a valence of 2 to 6 and 2 to 14 carbon atoms include ethylene glycol, glycerin, trimethylolpropane and pentaerythritol. Out of these, aliphatic alcohols having a valence of 3 to 6 and 3 to 14 carbon atoms are preferred and glycerin is particularly preferred.

Examples of the aliphatic monocarboxylic acid having 12 to 24 carbon atoms are the same as those enumerated for the above monoester compound.

The partial ester compound as an optional component is used in an amount of preferably $5 \times 10^{-4}$ to 0.5 part by weight, more preferably $5 \times 10^{-4}$ to 0.3 part by weight based on 100 parts by weight of the aromatic polycarbonate (A).

The partial ester compound (D) is used in such an amount that the total amount of the compound (D) and the above compound (B) becomes $1 \times 10^{-3}$ to 0.7 part by weight. In this case, the weight ratio of the above compound (B) to the partial ester compound (D) as an optional component is preferably 80/20 to 20/80, more preferably 50/50 to 30/70.

The first composition of the present invention may further contain a cyclic compound represented by the following formula (3) as an optional component:

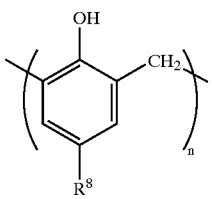

(3)

wherein $R^8$ is a hydrogen atom or hydrocarbon group having 1 to 4 carbon atoms, and n is a number of 4 to 20, in an amount of $1 \times 10^{-5}$ to $1 \times 10^{-2}$ part by weight based on 100 parts by weight of the aromatic polycarbonate.

Use of this cyclic compound is effective in eliminating such inconvenience as an increase in the amount of the residual phenol in the first composition, color development or quality deterioration at the time of melt molding at a high temperature, particularly a temperature higher than 300° C., or the formation of a silver streak.

Use of the cyclic compound as an agent for preventing color development, namely, a yellowing inhibitor is new and first provided by the present invention.

$R^8$ in the above formula (3) is a hydrocarbon group having 1 to 4 carbon atoms typified by a hydrogen atom or alkyl group such as methyl, ethyl, n-propyl, n-butyl or t-butyl. Out of these, a hydrogen atom and t-butyl group are preferred. n is the number of repetitions of the unit represented by the formula (3) and an integer of 4 to 20, preferably 4 to 10. In the cyclic compound, a ring is formed by connecting an "n" number of the units of the above formula (3) at both ends of bonds.

The above cyclic compound used in the present invention is preferably a calix arene, such as calix [4] arene of the above formula (3) in which $R^8$ is a hydrogen atom and n is 4 or calix [6] arene of the formula (3) in which $R^8$ is a hydrogen atom and n is 6. These cyclic compounds may be used alone or in combination of two or more.

The above cyclic compound can be obtained by a commonly used organic reaction.

The amount of the above cyclic compound is preferably $1 \times 10^{-4}$ to $5 \times 10^{-3}$ part by weight based on 100 parts by weight of the aromatic polycarbonate (A). Within the above range, the cyclic compound can exhibit the effect of reducing the amount of the residual phenol in the polymer and improving thermal stability to the full.

The first composition of the present invention may further contain at least one compound selected from the group consisting of hydrochloric acid, phosphoric acid, phosphorous acid, boric acid and amines salts and ammonium salts thereof as an optional component in an amount of $1 \times 10^{-5}$ to $1 \times 10^{-2}$ part by weight based on 100 parts by weight of the aromatic polycarbonate (A).

These optional components exhibit the same function as the above cyclic compound.

Amines constituting the above amine salts are secondary amines such as dimethylamine, diethylamine, dibutylamine, dioctylamine, dilaurylamine, piperazine, piperidine and cyclobutylamine; and tertiary amines such as trimethylamine, triethylamine, tributylamine and pyridine.

The compound as an optional component is used in an amount of $1 \times 10^{-4}$ to $5 \times 10^{-3}$ part by weight based on 100 parts by weight of the aromatic polycarbonate. The first composition of the present invention may further contain an aromatic phosphorous acid-ester in an amount of $1 \times 10^{-4}$ to 0.1 part by weight based on 100 parts by weight of the aromatic polycarbonate (A).

Examples of the aromatic phosphorous acid ester include triaryl phosphites such as triphenyl phosphate, tricresyl phosphate, tris(ethylphenyl)phosphite, tris(2,4-di-t-butylphenyl)phosphite, tris(nonylphenyl)phosphite and tris(hydroxyphenyl)phosphite; and arylalkyl phosphites such as phenyldidecyl phosphate, diphenyldecyl phosphite, diphenylisooctyl phosphite, phenylisooctyl phosphate and 2-ethylhexyldiphenyl phosphite.

The aromatic phosphorous acid ester is preferably contained in an amount of $1 \times 10^{-3}$ to $5 \times 10^{-2}$ part by weight based on 100 parts by weight of the aromatic polycarbonate (A).

A description is subsequently given of the second composition of the present invention.

As described above, the second composition comprises:
(A) 100 parts by weight of an aromatic polycarbonate;
(D) $5 \times 10^{-4}$ to 0.5 part by weight of a partial ester compound of an aliphatic alcohol having a valence of 2 to 6 and 2 to 14 carbon atoms and an aliphatic monocarboxylic acid having 12 to 24 carbon atoms; and
(C) $1 \times 10^{-5}$ to $1 \times 10^{-2}$ part by weight of at least one compound selected from the group consisting of a cyclic compound represented by the following formula (3):

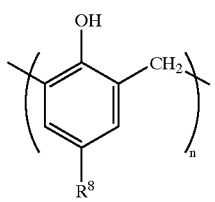

wherein $R^8$ is a hydrogen atom or hydrocarbon. group having 1 to 4 carbon atoms, and n is a number of 4 to 20, hydrochloric acid, phosphoric acid, phosphorous acid, boric acid, and amine salts and ammonium salts thereof.

The second composition contains the above three components (A), (D) and (C) as essential ingredients but these components have already been described in the section of the first composition. That is, the second composition of the present invention contains a specific combination of some optional components of the first composition to attain the same effect as the first composition.

The aromatic polycarbonate (A) is identical to that described for the first composition.

The partial ester compound (D) of an aliphatic alcohol having a valence of 2 to 6 and 2 to 14 carbon atoms and an aliphatic monocarboxylic acid having 12 to 24 carbon atoms is identical to that described for the first composition.

The at least one compound selected from the group consisting of the cyclic compound as the component (C) represented by the above formula (3), hydrochloric acid, phosphoric acid, phosphorous acid, boric acid, and amine salts and ammonium salts thereof is identical to that described for the first composition.

It is especially noted that the second composition preferably further contains an aromatic phosphorous acid ester as an optional component in an amount of $1 \times 10^{-4}$ to 0.1 part by weight based on 100 parts by weight of the aromatic polycarbonate.

As for what is not described herein of the second composition, it should be understood that what has been described of the first composition is applied directly or with modifications obvious to one of ordinary skill in the art unless there is inconvenience or inconsistency.

The first composition and the second composition of the present invention may contain other additives such as processing stabilizer, heat resistant stabilizer, antioxidant, optical stabilizer, ultraviolet light absorber, metal inactivating agent, metal soap, nucleating agent, antistatic agent, lubricant, flame retardant, release agent, mildewproofing agent, colorant, antifogging agent, natural oil, synthetic oil, wax, organic filler, inorganic filler and the like in limits that do not impair the object of the present invention.

Illustrative examples of some of these additives are given below. Examples of the processing stabilizer include 2-t-butyl-6-(3-t-butyl-2-hydroxy-5-methylbenzyl)-4-methylphenyl acrylate and 2-[1-(2-hydroxy-3,5-di-t-pentylphenyl)ethyl]-4,6-di-t-pentylphenyl acrylate.

Examples of the optical stabilizer include benzotriazole-based compounds such as 2-(3-t-butyl-2-hydroxy-5-methylphenyl)-5-chlorobenzotriazole, 2-(3,5-di-t-butyl-2-hydroxyphenyl)benzotriazole, 2-(2-hydroxy-5-methylphenyl)benzotriazole, 2-(2-hydroxy-5-t-octylphenyl)benzotriazole, 2-(3,5-di-t-pentyl-2-hydroxyphenyl)benzotriazole, 2-[2-hydroxy-3-(3,4,5,6-tetrahydrophthalimidemethyl)phenyl]benzotriazole and 2-[2-hydroxy-3,5-bis(α, α-dimethylbenzyl)phenyl]benzotriazole; benzophenone-based compounds such as 2-hydroxy-4-octyloxybenzophenone and 2-hydroxy-4-methoxybenzophenone; hydroxybenzoate-based compounds such as 2,4-di-t-butylphenyl and 3,5-di-t-butyl-4-hydroxybenzoate; ultraviolet light absorbers such as cyanoacrylate-based compounds including ethyl-2-cyano-3, 3-diphenyl acrylate; and nickel-based quenchers such as nickel dibutyldithiocarbamate and [2,2'-thiobis(4-t-octylphenolate)]-2-ethylhexylamine nickel.

Examples of the metal inactivating agent include N,N'-[3-(3,5-di-t-butyl-4-hydroxyphenyl)propionyl]hydrazine and the like. Examples of the metal soap include calcium stearate, nickel stearate and the like.

Examples of the nucleating agent include sorbitol-based and phosphate-based compounds such as sodium di(4-t-butylphenyl)phosphonate, dibenzylidene sorbitol and methylenebis(2,4-di-t-butylphenol)acid phosphate sodium salt.

Examples of the antistatic agent include quaternary ammonium salt-based compounds such as (β-lauramidepropyl)-trimethyl ammonium methyl sulfate and alkyl phosphate-based compounds.

Examples of the flame retardant include halogen-containing phosphates such as tris(2-chloroethyl)phosphate; halides such as hexabromocyclododecane and decabromophenyl oxide; metal inorganic compounds such as antimony trioxide, antimony pentoxide and aluminum hydroxide, and mixtures thereof.

The method of producing the resin composition of the present invention from the above components is not particularly limited. The blending order of the above components is arbitrary. For instance, essential ingredients and optional ingredients may be added to and kneaded with the aromatic polycarbonate in a molten state, or may be added to or kneaded with a solution of the aromatic polycarbonate. Stated more specifically, there may be employed a method in which essential ingredients and optional ingredients-are directly added to and kneaded with an aromatic polycarbonate which is the reaction product in a reactor or extruder obtained in a molten state after the end of a polymerization reaction separately or simultaneously, a method in which the obtained aromatic polycarbonate is pelletized and the pellets are supplied to a single-screw or double-screw extruder together with essential ingredients and optional ingredients to be molten and kneaded, and a method in which the obtained aromatic polycarbonate is dissolved in an appropriate solvent (for example, methylene chloride, chloroform, toluene, tetrahydrofuran, etc.) and essential ingredients and optional ingredients are added to this solution separately or simultaneously and stirred. The method in which a sulfonic acid compound and essential ingredients are added to and kneaded with an aromatic polycarbonate obtained in a molten state by melt polymerization and the resulting composition is pelletized is preferred to reduce the heat history time in a molten state and the number of times of re-melting.

Since the thus obtained polycarbonate composition is excellent in terms of heat stability such as no reduction in molecular weight at the time of molding and color retention as well as moldability such as releasability and transferability, it can be preferably used in optical materials, particularly optical recording disk substrates. That is, since the polycarbonate composition obtained by the present invention has excellent thermal stability and releasability when it is molded into a disk, it can be preferably used in-optical recording disk substrates.

According to the present invention, there are also provided a substrate for optical recording media made from the polycarbonate composition of the present invention and an optical recording medium comprising the above substrate for optical recording media and an optical recording layer formed on one side of the substrate directly or through an interlayer.

This optical recording medium may have a dielectric layer and a reflective layer as required like a known optical recording medium.

EXAMPLES

The following examples are provided for the purpose of further illustrating the present invention but are in no way to be taken as limiting.

Examples 1 to 13 and Comparative Examples 1 and 2

228 parts by weight of bisphenol A (to be abbreviated as BPA hereinafter), 223 parts by weight of diphenyl carbonate (to be abbreviated as DPC hereinafter), 0.009 part by weight of tetramethyl ammonium hydroxide and 0.00014 part by weight of a bisphenol A disodium salt were charged into a reactor equipped with a stirrer, distillation column and decompressor, the inside of the reactor was substituted with nitrogen, and the above components were dissolved at 140° C. After 30 minutes of agitation, the inside temperature was elevated to 180° C., a reaction was carried out at an inside pressure of 100 mmHg for 30 minutes, and the generated phenol was distilled off.

Thereafter, the reaction was continued while the phenol was distilled off for 30 minutes by elevating the inside temperature to 200° C. and gradually reducing the pressure to 50 mmHg. The reaction was further continued by elevating the temperature to 220° C. and reducing the pressure to 30 mmHg, maintaining that temperature and pressure for 30 minutes, raising the temperature to 240° C. and reducing the pressure to 10 mmHg and further to 260° C. and 1 mmHg repeatedly. Finally, the polycondensation of a polycarbonate was continued at a temperature of 270° C. The viscosity average molecular weight of the obtained polycarbonate was 15,500.

This polymer was inserted into a double-screw extruder (L/D of 17.5, barrel temperature of 270° C.) by a gear pump in a molten state, a cyclic carbonate compound, monoester compound, ether compound, cyclic compound, amine salt of acid/acid, partial ester compound, sulfonic acid compound and aromatic phosphorous acid ester shown in Table 1 were added to and kneaded with the polymer in predetermined amounts, and the resulting composition was passed through a die to be formed into a strand which was then cut by a cutter to produce pellets.

Evaluation of Obtained Pellets

The pellets obtained in the above Examples 1 to 13 and Comparative Examples 1 and 2 were evaluated as follows. The evaluation results are shown in the above Tables 1 to 3.

(1) Residual Phenol

This is measured by high-speed liquid chromatography (HPLC8020 System of Toso Corporation).

(2) Releasability

A hundred 120 mm diameter compact disk substrates are molded continuously with a CD molding machine using a nickel stamper at a cylinder temperature of 340° C., a mold temperature of 80° C. and a cycle time of 7 seconds. The residue of the composition on the mold of a disk or sprue is evaluated as defective ratio (%).

(3) Transferability

Pits transferred to the. disk substrate obtained by the method (2) are observed through an optical microscope (800×) and evaluated. 10 disk substrates are evaluated for each of Examples and Comparative Examples.

(4) Thermal Stability

The obtained pellets are caused to reside in an injection molding machine (cylinder temperature of 340° C., mold temperature of 80° C.) for 12 minutes to produce a 2 mm thick molded plate. The difference of color (ΔE) before and after residence is measured with the Color and Color Difference Meter ND-1001DP of Nippon Denshoku Kogyo Co., Ltd. The color difference (ΔE) is measured in accordance with JIS8722 and Z8730.

TABLE 1

|  |  |  | Ex. 1 | Ex. 2 | Ex. 3 |
|---|---|---|---|---|---|
| (B) cyclic carbonate compound | type |  | (B1) | (B2) | — |
|  | quantity | (ppm) | 450 | 450 | — |
| (B) monoester compound | type |  | — | — | propylene glycol monostearate |
|  | quantity | (ppm) | — | — | 450 |
| (B) ether compound | type |  | — | — | — |
|  | quantity | (ppm) | — | — | — |

TABLE 1-continued

|  |  |  | | | |
|---|---|---|---|---|---|
| (C) cyclic compound | type | | — | — | — |
|  | quantity | (ppm) | — | — | — |
| (C) amine salt of acid/acid | type | | — | — | — |
|  | quantity | (ppm) | — | — | — |
| (D) partial ester compound | type | | — | — | — |
|  | quantity | (ppm) | — | — | — |
| sulfonic acid compound | type | | DBSTBP | DBSTBP | DBSTBP |
|  | quantity | (ppm) | 10 | 10 | 10 |
| aromatic phosphorous acid ester | type | | TTBPP | TTBPP | TTBPP |
|  | quantity | (ppm) | 100 | 100 | 100 |
| characteristic properties of pellet | residual phenol | (ppm) | 30 | 25 | 20 |
| CD molding properties | releasability | (defective ratio %) | 0 | 1 | 0 |
|  | transferability | | all satisfactory | all satisfactory | all satisfactory |
|  | thermal stability | $\Delta E$ | 0.2 | 0.1 | 0.1 |

|  |  |  | Ex. 4 | Ex. 5 | Ex. 6 |
|---|---|---|---|---|---|
| (B) cyclic carbonate compound | type | | — | — | — |
|  | quantity | (ppm) | — | — | — |
| (B) monoester compound | type | | propylene glycol monopalmitate | propylene glycol monopalmitate | propylene glycol monobehenate |
|  | quantity | (ppm) | 450 | 200 | 500 |
| (B) ether compound | type | | — | — | — |
|  | quantity | (ppm) | — | — | — |
| (C) cyclic compound | type | | — | — | — |
|  | quantity | (ppm) | — | — | — |
| (C) amine salt of acid/acid | type | | — | — | — |
|  | quantity | (ppm) | — | — | — |
| (D) partial ester compound | type | | — | — | — |
|  | quantity | (ppm) | — | — | — |
| sulfonic acid compound | type | | DBSTBP | DBSTBP | DBSTBP |
|  | quantity | (ppm) | 10 | 10 | 10 |
| aromatic phosphorous acid ester | type | | TTBPP | TTBPP | TTBPP |
|  | quantity | (ppm) | 100 | 50 | 100 |
| characteristic properties of pellet | residual phenol | (ppm) | 25 | 20 | 30 |
| CD molding properties | releasability | (defective ratio %) | 0 | 0 | 0 |
|  | transferability | | all satisfactory | all satisfactory | all satisfactory |
|  | thermal stability | $\Delta E$ | 0.1 | 0.1 | 0.2 |

|  |  |  | Ex. 7 | Ex. 8 | Ex. 9 |
|---|---|---|---|---|---|
| (B) cyclic carbonate compound | type | | — | (B2) | (B1) |
|  | quantity | (ppm) | — | 315 | 200 |
| (B) monoester compound | type | | — | — | — |
|  | quantity | (ppm) | — | — | — |
| (B) ether compound | type | | batyl alcohol | — | — |
|  | quantity | (ppm) | 450 | — | — |
| (C) cyclic compound | type | | — | — | — |
|  | quantity | (ppm) | — | — | — |
| (C) amine salt of acid/acid | type | | — | — | tributyl amine hydrochloride |
|  | quantity | (ppm) | — | — | 10 |
| (D) partial ester compound | type | | — | monoglyceride stearate | monoglyceride stearate |
|  | quantity | (ppm) | — | 135 | 200 |
| sulfonic acid compound | type | | DBSTBP | DBSTBP | DBSTBP |
|  | quantity | (ppm) | 10 | 10 | 11 |
| aromatic phosphorous acid ester | type | | TTBPP | TTBPP | TTBPP |
|  | quantity | (ppm) | 100 | 100 | 100 |
| characteristic properties of pellet | residual phenol | (ppm) | 20 | 35 | 35 |
| CD molding properties | releasability | (defective ratio %) | 0 | 0 | 0 |
|  | transferability | | all satisfactory | all satisfactory | all satisfactory |
|  | thermal stability | $\Delta E$ | 0.1 | 0.2 | 0.2 |

|  |  |  | Ex. 10 | Ex. 11 | Ex. 12 |
|---|---|---|---|---|---|
| (B) cyclic carbonate compound | type | | — | — | — |
|  | quantity | (ppm) | — | — | — |
| (B) monoester compound | type | | — | — | — |

TABLE 1-continued

|  |  |  |  |  |  |
|---|---|---|---|---|---|
| (B) ether compound | quantity type | (ppm) | — — | — — | — — |
| (C) cyclic compound | quantity type | (ppm) | calix [4] arene 10 | calix [6] arene 10 | — — |
| (C) amine salt of acid/acid | quantity type | (ppm) | — — | — — | triethylamine phosphate 5 |
| (D) partial ester compound | quantity type | (ppm) | monoglyceride stearate 450 | monoglyceride stearate 450 | monoglyceride stearate 450 |
| sulfonic acid compound | quantity type | (ppm) | DBSTBP 10 | DBSTBP 10 | DBSTBP 10 |
| aromatic phosphorous acid ester | quantity type | (ppm) | TTBPP 100 | TTBPP 100 | TTBPP 100 |
| characteristic properties of pellet | residual phenol | (ppm) | 35 | 30 | 35 |
| CD molding properties | releasability | (defective ratio %) | 0 | 0 | 0 |
|  | transferability |  | all satisfactory | all satisfactory | all satisfactory |
|  | thermal stability | ΔE | 0.1 | 0.1 | 0.1 |

|  |  |  | Ex. 13 | C. Ex. 1 | C. Ex. 2 |
|---|---|---|---|---|---|
| (B) cyclic carbonate compound | type quantity | (ppm) | — — | — — | — — |
| (B) monoester compound | type quantity | (ppm) | — — | — — | — — |
| (B) ether compound | type quantity | (ppm) | — — | — — | — — |
| (C) cyclic compound | type quantity | (ppm) | — — | — — | — — |
| (C) amine salt of acid/acid | type quantity | (ppm) | tributyl amine hydrochloride 10 | — — | — — |
| (D) partial ester compound | type quantity | (ppm) | monoglyceride stearate 450 | — — | monoglyceride stearate 450 |
| sulfonic acid compound | type quantity | (ppm) | DBSTBP 10 | DBSTBP 10 | DBSTBP 10 |
| aromatic phosphorous acid ester | type quantity | (ppm) | TTBPP 100 | TTBPP 100 | TTBPP 100 |
| characteristic properties of pellet | residual phenol | (ppm) | 25 | 20 | 55 |
| CD molding properties | releasability | (defective ratio %) | 0 | continuous production impossible | 0 |
|  | transferability |  | all satisfactory | nonuniform in shape | All satisfactory |
|  | thermal stability | ΔE | 0.2 | 0.1 | 0.7 |

Ex.: Example
C. Ex.: Comparative Example
DBSTBP: tetrabutyl phosphonium dodecylbenzene sulfonate
TTBPP: tris(2,4-di-t-butylphenyl)phosphite (B1) 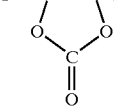

(B2) 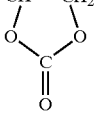

What is claimed is:

1. An aromatic polycarbonate resin composition comprising:

(A) 100 parts by weight of an aromatic polycarbonate; and (B) $5 \times 10^{-4}$ to 0.5 part by weight of at least one member selected from the group consisting of a cyclic carbonate compound represented by the following formula (1), a combination of the cyclic carbonate compound and a monoester compound of a divalent aliphatic alcohol having 3 to 14 carbon atoms and an aliphatic monocarboxylic acid having 12 to 24 carbon atoms, a combination of the cyclic carbonate compound and an ether compound obtained by converting at least one hydroxyl group of a polyvalent aliphatic alcohol having 2 to 14 carbon atoms into an aliphatic oxy group having 1 to 18 carbon atoms:

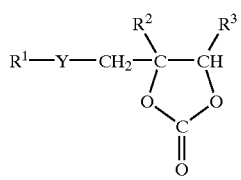
(1)

wherein $R^1$ is a monovalent hydrocarbon group having 1 to 20 carbon atoms, $R^2$ and $R^3$ are the same or different and each a hydrogen atom or monovalent hydrocarbon group having 1 to 10 carbon atoms, and Y is a single bond, ether bond, ester bond or carbonate bond, and a combination of the cyclic carbonate, the monoester compound and the ether compound.

2. The aromatic polycarbonate resin composition of claim 1, wherein the aromatic polycarbonate (A) comprises mainly a recurring unit represented by the following formula (2):

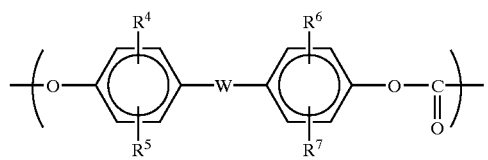
(2)

wherein $R^4$, $R^5$, $R^6$ and $R^7$ are independently a hydrogen atom, alkyl group-having 1 to 10 carbon atoms, aryl group having 6 to 10 carbon atoms or aralkyl group having 7 to 10 carbon atoms, and W is an alkylene group having 1 to 10 carbon atoms, alkylidene group having 2 to 10 carbon atoms, cycloalkylene group having 6 to 10 carbon atoms, cycloalkylidene group having 6 to 10 carbon atoms, alkylene-arylene-alkylene group having 8 to 15 carbon atoms, oxygen atom, sulfur atom, sulfoxide group or sulfone group.

3. The aromatic polycarbonate resin composition of claim 1 or 2, wherein the aromatic polycarbonate (A) is obtained by reacting an aromatic dihydroxy compound with a carbonic acid diester in an amount of 1.0 to 1.1 mols based on 1 mol of the aromatic dihydroxy compound in the presence of $1\times10^{-8}$ to $1\times10^{-5}$ mol of at least one ester exchange catalyst selected from the group consisting of alkali metal compounds and alkali earth metal compounds.

4. The aromatic polycarbonate resin composition of claim 1, wherein the cyclic carbonate compound represented by the above formula (1) is represented by the following formula

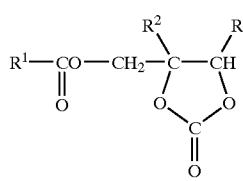
(1)-1 wherein $R^1$, $R^2$ and $R^3$ are as defined hereinabove.

5. The aromatic polycarbonate resin composition of claim 1, wherein the divalent aliphatic alcohol having 3 to 14 carbon atoms constituting the above monoester compound has one hydroxyl group at the 1-position.

6. The aromatic polycarbonate resin composition of claim 5, wherein the aliphatic alcohol is selected from the group consisting of propanediol, butanediol, pentanediol, hexanediol and decanediol.

7. The aromatic polycarbonate resin composition of claim 1, wherein the polyvalent aliphatic alcohol constituting the ether compound has a valence of 2 to 6.

8. The aromatic polycarbonate resin composition of claim 1, wherein the aliphatic oxy group having 1 to 18 carbon atoms constituting the ether compound is an alkoxy group having 1 to 18 carbon atoms.

9. The aromatic polycarbonate resin composition of claim 1 which further comprises (D) $5\times10^{-4}$ to 0.5 part by weight of a partial ester compound of an aliphatic alcohol having a valence of 2 to 6 and 2 to 14 carbon atoms and an aliphatic monocarboxylic acid having 12 to 24 carbon atoms.

10. The aromatic polycarbonate resin composition of claim 9 which comprises the partial ester compound and the above compound (B) in a total amount of $1\times10^{-3}$ to 0.7 part by weight.

11. The aromatic polycarbonate resin composition of claim 1 or 9 which further comprises $1\times10^{-5}$ to $1\times10^{-2}$ part by weight of a cyclic compound represented by the following formula (3):

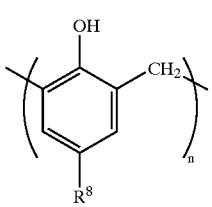
(3)

wherein $R^8$ is a hydrogen atom or hydrocarbon group having 1 to 4 carbon atoms, and n is a number of 4 to 20.

12. The aromatic polycarbonate resin composition of claim 1 or 9 which further comprises $1\times10^{-5}$ to $1\times10^{-2}$ part by weight of at least one compound selected from the group consisting of hydrochloric acid, phosphoric acid, phosphorous acid, boric acid, and amine salts and ammonium salts thereof.

13. The aromatic polycarbonate resin composition of claim 3 which further comprises $1\times10^{-5}$ to $1\times10^{-2}$ part by weight of a sulfonic acid compound represented by the following formula (4):

$$A^1-SO_3X^1 \quad (4)$$

wherein $A^1$ is a monovalent hydrocarbon group having 1 to 30 carbon atoms which may have a substituent, and $X^1$ is an ammonium cation, phosphonium cation or monovalent hydrocarbon group having 1 to 10 carbon atoms.

14. The aromatic polycarbonate resin composition of claim 13, wherein the sulfonic acid compound of the above formula (4) is represented by the following formula (4)-1:

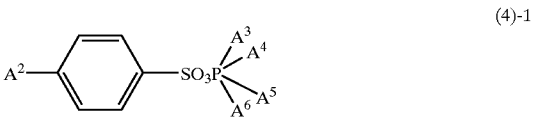
(4)-1 wherein $A^2$, $A^3$, $A^4$, $A^5$ and $A^6$ are independently a monovalent hydrocarbon group having 1 to 20 carbon atoms.

15. The aromatic polycarbonate resin composition of claim 1 which further comprises an aromatic phosphorous acid ester in an amount of $1\times10^{-4}$ to 0.1 part by weight.

16. A method for improving the releasability of an aromatic polycarbonate, which comprises mixing at least one member selected from the group consisting of a cyclic carbonate compound represented by the following formula (1), a combination of the cyclic carbonate compound and a monoester compound of a divalent aliphatic alcohol having 3 to 14 carbon atoms and an aliphatic monocarboxylic acid having 12 to 24 carbon atoms, a combination of the cyclic carbonate compound and an ether compound obtained by converting at least one hydroxyl group of a polyvalent aliphatic alcohol having 2 to 14 carbon atoms into an aliphatic oxy group having 1 to 18 carbon atoms:

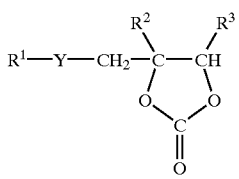

(1)

wherein $R^1$ is a monovalent hydrocarbon group having 1 to 20 carbon atoms, $R^2$ and $R^3$ are the same or different and each a hydrogen atom or monovalent hydrocarbon group having 1 to 10 carbon atoms, and Y is a single bond, ether bond, ester bond or carbonate bond, and a combination of the cyclic carbonate, the monoester compound and the ether compound with the aromatic polycarbonate.

17. A releasability modifier for aromatic polycarbonates which comprises the above compound (B).

18. A thermal yellowing inhibitor for aromatic polycarbonates which comprises a compound represented by the above formula (3).

19. An aromatic polycarbonate resin composition comprising:
    (A) 100 parts by weight of an aromatic polycarbonate;
    (D) $5 \times 10^{-4}$ to 0.5 part by weight of a partial ester compound of an aliphatic alcohol having a valence of 2 to 6 and 2 to 14 carbon atoms and an aliphatic monocarboxylic acid having 12 to 24 carbon atoms; and
    (C) $1 \times 10^{-5}$ to $1 \times 10^{-2}$ part by weight of a cyclic compound represented by the following formula (3):

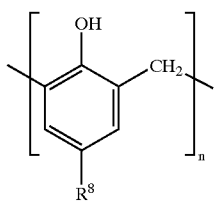

(3)

wherein $R^8$ is a hydrogen atom or hydrocarbon group having 1 to 4 carbon atoms, and n is a number of 4 to 20, or at least one compound selected from the group consisting of hydrochloric acid amine salts, phosphoric acid amine salts, phosphorous acid amine salts, boric acid amine salts, hydrochloric acid ammonium salts, phosphoric acid ammonium salts, phosphorous acid ammonium salts and boric acid ammonium salts.

20. The aromatic polycarbonate resin composition of claim 19, wherein the aromatic polycarbonate (A) comprises mainly a recurring unit represented by the following formula (2):

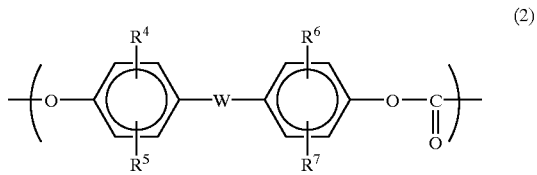

(2)

wherein $R^4$, $R^5$, $R^6$ and $R^7$ are independently a hydrogen atom, alkyl group having 1 to 10 carbon atoms, aryl group having 6 to 10 carbon atoms or aralkyl group having 7 to 10 carbon atoms, and W is an alkylene group having 1 to 10 carbon atoms, alkylidene group having 2 to 10 carbon atoms, cycloalkylene group having 6 to 10 carbon atoms, cycloalkylidene group having 6 to 10 carbon atoms, alkylene-arylene-alkylene group having 8 to 15 carbon atoms, oxygen atom, sulfur atom, sulfoxide group or sulfone group.

21. The aromatic polycarbonate resin composition of claim 19 or 20, wherein the aromatic polycarbonate (A) is obtained by reacting an aromatic dihydroxy compound with a carbonic acid diester in an amount of 1.0 to 1.1 mols based on 1 mol of the aromatic dihydroxy compound in the presence of $1 \times 10^{-8}$ to $1 \times 10^{-5}$ mol of at least one ester exchange catalyst selected from the group consisting of alkali metal compounds and alkali earth metal compounds.

22. The aromatic polycarbonate resin composition of claim 21 which further comprises $1 \times 10^{-5}$ to $1 \times 10^{-2}$ part by weight of a sulfonic acid compound represented by the following formula (4):

$$A^1—SO_3X^1 \quad (4)$$

wherein $A^1$ is a monovalent hydrocarbon group having 1 to 30 carbon atoms.which may-have a substituent, and $X^1$ is an ammonium cation, phosphonium cation or monovalent hydrocarbon group having 1 to 10 carbon atoms.

23. The aromatic polycarbonate resin composition of claim 22, wherein the sulfonic acid compound of the above formula (4) is represented by the following formula (4)-1:

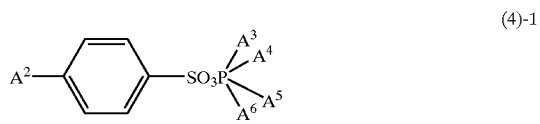

(4)-1 wherein $A^2$ $A^3$, $A^4$, $A^5$ and $A^6$ are independently a monovalent hydrocarbon group having 1 to 20 carbon atoms.

24. The aromatic polycarbonate resin composition of claim 19 which further comprises an aromatic phosphorous acid ester in an amount of $1 \times 10^{-4}$ to 0.1 part by weight.

25. A substrate for optical recording media which is made from the aromatic polycarbonate resin composition of claim 1 or 19.

26. An optical recording medium comprising the substrate of claim 25 and an optical recording layer formed on one side of the substrate directly or through an interlayer.

* * * * *

UNITED STATES PATENT AND TRADEMARK OFFICE
CERTIFICATE OF CORRECTION

PATENT NO.    : 6,407,199 B1
DATED         : June 18, 2002
INVENTOR(S)   : Masumi Hirata, Toru Sawaki, Wataru Funakoshi, Katsushi Sasaki and Jyuhou Matsuo It is certified that error appears in the above-identified patent and that said Letters Patent is hereby corrected as shown below:

<u>Title page,</u>
Item [30], Foreign Application Priority Data, delete "11-362101" and insert -- 11-362701 --.

Signed and Sealed this

Third Day of September, 2002

Attest:

Attesting Officer

JAMES E. ROGAN
*Director of the United States Patent and Trademark Office*